(12) United States Patent
Suzuki

(10) Patent No.: US 8,773,394 B2
(45) Date of Patent: Jul. 8, 2014

(54) VEHICULAR OPERATING DEVICE

(75) Inventor: Takeyuki Suzuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 13/431,451

(22) Filed: Mar. 27, 2012

(65) Prior Publication Data

US 2012/0249473 A1 Oct. 4, 2012

(30) Foreign Application Priority Data

Mar. 30, 2011 (JP) ................... 2011-075786

(51) Int. Cl.
*G06F 3/044* (2006.01)

(52) U.S. Cl.
USPC ....................... 345/174; 340/407.1

(58) Field of Classification Search
CPC ................. G06F 3/041; G06F 3/044
USPC ............... 345/173–178; 340/407.1
See application file for complete search history.

(56) References Cited

U.S. PATENT DOCUMENTS

| 8,094,127 B2 * | 1/2012 | Young ........................... 345/173 |
| 2007/0080953 A1 * | 4/2007 | Lii ................................ 345/173 |
| 2008/0024459 A1 * | 1/2008 | Poupyrev et al. ............. 345/173 |
| 2009/0153664 A1 * | 6/2009 | Higuchi et al. ............... 348/148 |
| 2011/0141052 A1 * | 6/2011 | Bernstein et al. ............. 345/174 |
| 2011/0148811 A1 * | 6/2011 | Kanehira et al. .............. 345/174 |

FOREIGN PATENT DOCUMENTS

| JP | 2007-164814 | 6/2007 |
| JP | 2009-298285 | 12/2009 |
| JP | 2010-114016 | 5/2010 |

OTHER PUBLICATIONS

Japanese Office Action, Application No. 2011-075786, dated Nov. 27, 2012, with English Translation, 6 pages.

* cited by examiner

*Primary Examiner* — Amare Mengistu
*Assistant Examiner* — Stacy Khoo
(74) *Attorney, Agent, or Firm* — Rankin, Hill & Clark LLP

(57) ABSTRACT

An operation detection unit of a vehicular operating device is configured to detect a pressing force in a pressing direction substantially perpendicular to a plane including an operation direction of a slide operation by the finger of an operator on an operating surface. A control device does not execute recognition of a gesture pattern based on the slide operation if the pressing force detected by the operation detection unit is smaller than a first threshold value A, and recognizes a gesture pattern based on the slide operation after the pressing force has reached the first threshold value A or more. The control device controls a vehicle equipment in accordance with the recognized gesture pattern.

2 Claims, 11 Drawing Sheets

(A)

(B)

(A)

(B)

VEHICULAR OPERATING DEVICE

CROSS-REFERENCE TO RELATED APPLICATION

Priority is claimed on Japanese Patent Application No. 2011-075786, filed Mar. 30, 2011, the disclosure of which is hereby incorporated herein by reference in its entirety.

BACKGROUND OF THE INVENTION

1. Field of the Invention

The present invention relates to a vehicular operating device.

2. Description of Related Art

In the related art, for example, a technique is known in which a touch pad having a plurality of touch sensors is arranged in the left and right spokes of a steering wheel of a vehicle, and an in-vehicle unit is controlled based on a combination of gestures by touch operations on the touch pad (for example, see Japanese Unexamined Patent Application Publication No. 2009-298285).

SUMMARY OF THE INVENTION

However, in the technique of the related art, since a capacitive sensor is used as a touch sensor, when the touch pad is arranged on the steering wheel, an erroneous operation is likely to result.

When a configuration is made such that it is determined that a touch operation is carried out if there is a sufficient change in capacitance of the touch sensor, a touch operation on the wide surface of the touch pad is necessary, resulting in deterioration in operability.

A gesture operation is detected by sequentially scanning the presence/absence of a touch operation by the finger of an operator on multiple capacitive sensors arranged in the touch pad. For this reason, in order to secure a ground connection of the capacitive sensors or the like, a large space is necessary at the rear of the touch pad, and a position where the touch pad can be disposed is restricted. A range in which the finger moves on the touch pad is widened, causing an increase in an operation load.

The invention has been finalized in consideration of the above situation, and an object of the invention is to provide a vehicular operating device capable of realizing various operations with a single operating device while suppressing an erroneous operation.

In order to solve the problems and to achieve the object, an aspect of the invention is implemented as follows.

(1) A vehicular operating device according to an aspect of the invention includes a vehicle equipment which is mounted in a vehicle and controllable by a predetermined operation of an operator, an operation-detection device which has an operating surface and which detects a slide operation by a finger of the operator on the operating surface, a gesture recognition device which recognizes a predetermined gesture pattern based on the slide operation detected by the operation-detection device, and a control unit which controls the vehicle equipment in response to the gesture pattern recognized by the gesture recognition device. The operation-detection device is configured to detect a pressing force in a pressing direction substantially perpendicular to a plane including an operation direction of the slide operation, and the gesture recognition device does not execute recognition of the gesture pattern based on the slide operation if the pressing force detected by the operation-detection device is smaller than a predetermined value, and recognizes the gesture pattern based on the slide operation after the pressing force has reached the predetermined value or more.

(2) In the vehicular operating device described in (1), even when it has been detected that the pressing force is smaller than the predetermined value for a predetermined time after the operation-detection device has detected that the pressing force is equal to or greater than the predetermined value, the gesture recognition device may continue to recognize the gesture pattern based on the slide operation.

(3) In the vehicular operating device described in (2), the predetermined time may be a time for which the slide operation is continuously detected by the operation-detection device.

(4) The vehicular operating device described in any one of (1) to (3) may further include display device for displaying an operation object, which is operable in accordance with the predetermined operation, in a plurality of predetermined display regions to be visually recognizable by the operator. The display device may perform display such that the operation object moves in the predetermined display regions in response to the gesture pattern recognized by the gesture recognition device, and if the pressing force detected by the operation-detection device is equal to or greater than a second predetermined value greater than the predetermined value, the gesture recognition device may perform display such that the operation object moves from one display region from among the plurality of predetermined display regions to another display region.

(5) In the vehicular operating device described in any one of (1) to (4), the operation-detection device may be configured to detect a change amount or a change rate of the pressing force per predetermined unit time and may determine whether or not the pressing force is equal to or greater than the predetermined value based on the change amount or change rate of the pressing force.

(6) In the vehicular operating device described in any one of (1) to (5), the operation-detection device may be provided on a steering wheel of the vehicle, and if the steering angle of the steering wheel is equal to or greater than a predetermined steering angle, even when the pressing force detected by the operation-detection device is equal to or greater than the predetermined value, the gesture recognition device may inhibit recognition of the gesture pattern based on the slide operation.

(7) In the vehicular operating device described in any one of (1) to (5), the operation-detection device may be provided on a steering wheel of the vehicle, and if an operating switch different from the operation-detection device is operated, even when the pressing force detected by the operation-detection device is equal to or greater than the predetermined value, the gesture recognition device may inhibit recognition of the gesture pattern based on the slide operation.

(8) In the vehicular operating device described in any one of (1) to (7), the operation-detection device may include a capacitive sensor on the rear side of the operating surface in the pressing direction and an elastic member which is elastically deformable between the capacitive sensor and the operating surface, and a change in the pressing force may be detected based on a change in capacitance of the elastic member with the elastic deformation of the elastic member in the pressing direction.

(9) In the vehicular operating device described in any one of (1) to (7), the operation-detection device may include a piezoelectric element on the rear side of the operating surface in the pressing direction, and a change in the pressing force may be detected based on a change in resistance of the piezoelectric element pressed via the operating surface.

(10) In the vehicular operating device described in any one of (1) to (9), the operation-detection device may be attached to an attachment surface near the driver's seat of the vehicle, the operating surface may be a surface which forms a concave portion secluded relative to a surface around the attachment surface, and the concave portion may be configured to house a part of the finger of the operator who operates the operation-detection device.

According to the aspect (1), in the state where the pressing force has reached the predetermined value or more, it is determined that the operator is likely to intentionally carry out a gesture operation and the gesture pattern is recognized, thereby suppressing an erroneous operation on the vehicle equipment.

According to the aspect (2), it is possible to suppress frequent switching regarding whether or not a gesture pattern is recognized in accordance with a temporary change (decrease or the like) in the pressing force and to improve convenience.

According to the aspect (3), while a slide operation is continuously detected, it can be determined that the operator is likely to intentionally carry out a gesture operation, and a gesture pattern can be accurately recognized, thereby suppressing an erroneous operation on the vehicle equipment and improving convenience.

According to the aspect (4), when the pressing force which is equal to or greater than the second predetermined value greater than the predetermined value for determining whether or not a gesture pattern is recognized is detected, the operation object is displayed to cross over different display regions. Therefore, it is possible to prevent the operation object from being displayed to cross over different display regions despite the intention of the operator and to suppress an erroneous operation on the vehicle equipment.

According to the aspect (5), it is possible to improve determination precision regarding whether or not the operator intentionally carries out a gesture operation, and to suppress an erroneous operation on the vehicle equipment when the finger of the operator accidentally touches the operating surface.

According to the aspect (6), when the steering angle of the steering wheel provided with the operation-detection device is equal to or greater than the predetermined steering angle, it can be determined that an erroneous operation not intended by the operator is likely to occur, and recognition of a gesture pattern is inhibited, thereby suppressing an erroneous operation on the vehicle equipment and improving convenience.

According to the aspect (7), when another operating switch is operated, it can be determined that an erroneous operation not intended by the operator is likely to be detected by the operation-detection device, and recognition of a gesture pattern is inhibited, thereby suppressing an erroneous operation on the vehicle equipment and improving convenience.

According to the aspect (8), for example, it is possible to reduce the size of a capacitive sensor necessary for securing the operating surface of a desired size compared to a case where an elastic member is not provided, and to reduce a space necessary for mounting the operation-detection device.

It is possible to reduce the minimum operating area where an operation on the operating surface is detectable, to reduce an operation load, and to improve operability.

According to the aspect (9), it is possible to reduce the size of a piezoelectric element necessary for securing the operating surface of a desired size, and to reduce a space necessary for mounting the operation-detection device.

It is possible to reduce the minimum operating area where an operation on the operating surface is detectable, to reduce an operation load, and to improve operability.

According to the aspect (10), since the operating surface is the surface which forms the concave portion secluded relative to the surface around the attachment surface, it is possible to prevent the finger of the operator from accidentally touching the operating surface.

Even when the operator searches the operating surface with his/her finger without directly visually recognizing the operating surface, it is possible to accurately guide the finger of the operator to the operating surface.

Accordingly, it is possible to secure traveling safety even during driving of the vehicle, and to improve operability on the vehicle equipment.

DETAILED DESCRIPTION OF THE INVENTION

Hereinafter, a vehicular operating device according to an embodiment of the invention will be described with reference to the accompanying drawings.

Figure 1:
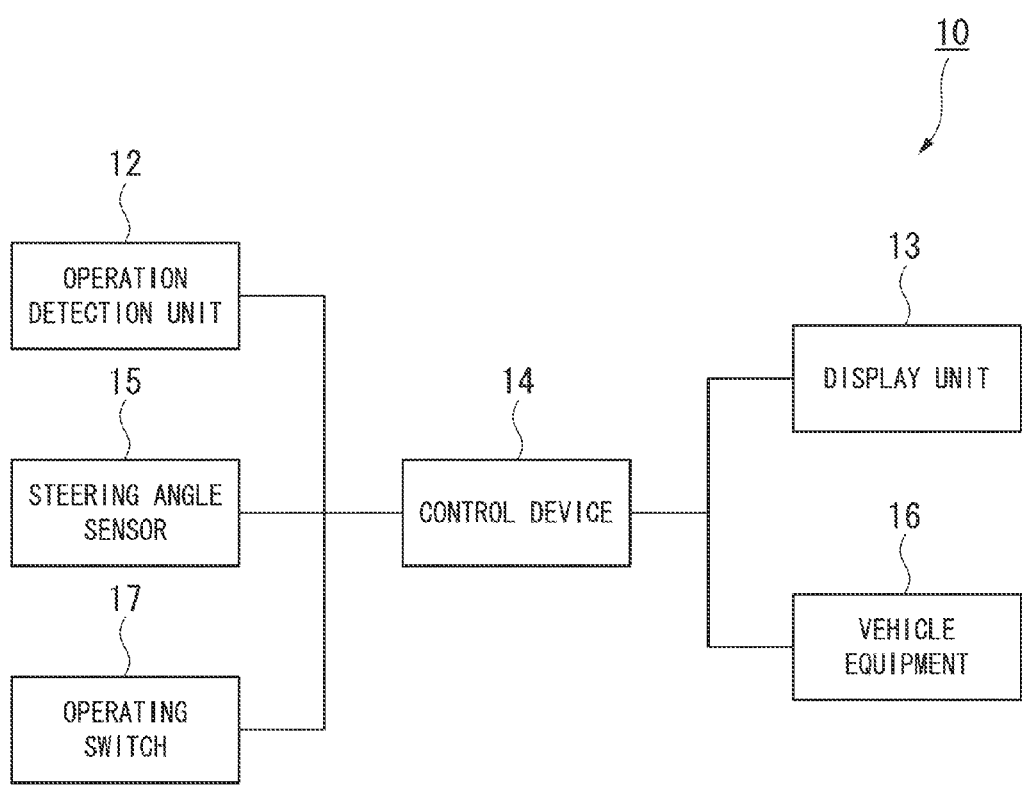
FIG. 1 is a configuration diagram of a vehicular operating device according to an embodiment of the invention.
Figure 2:
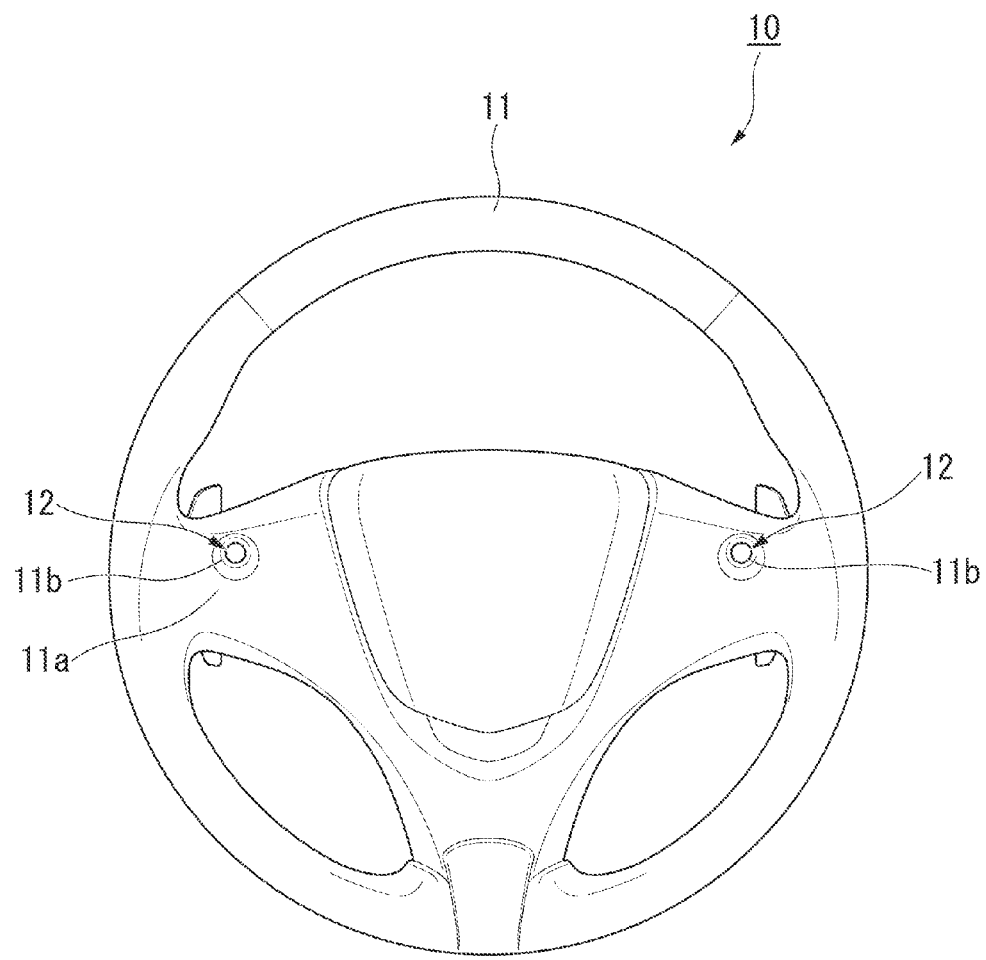
FIG. 2 is a configuration diagram of the vehicular operating device.

As shown in FIGS. 1 and 2, a vehicular operating device 10 of this embodiment includes operation detection units (operation-detection device) 12 provided on a steering wheel 11 of a vehicle, a display unit (display device) 13, a control device (gesture recognition device, control unit) 14, and a steering angle sensor 15.

The vehicular operating device 10 controls the operations of various vehicle equipments 16 in response to input operations on the operation detection units 12 by an operator (for example, driver).

The vehicle includes another operating switch 17 different from the operation detection unit 12 provided on the steering wheel 11, and is configured to control predetermined operations of various vehicle equipments 16 in response to an input operation on the operating switch 17 by the operator (for example, the driver).

For example, two operation detection units 12 and 12 in FIG. 2 are arranged at positions on the left and right sides from the rotating shaft O of the steering wheel 11 on an attachment surface near the driver's seat of the vehicle, for example, on the surface of a spoke 11a of the steering wheel 11 at a neutral position (that is, a position in a state where the vehicle travels in a straight line).

The positions where the two operation detection units 12 and 12 are arranged are, for example, positions where the operation detection units 12 are operable with the left and right fingers (for example, thumbs or the like) of the driver at the steering wheel 11.

Figure 3:
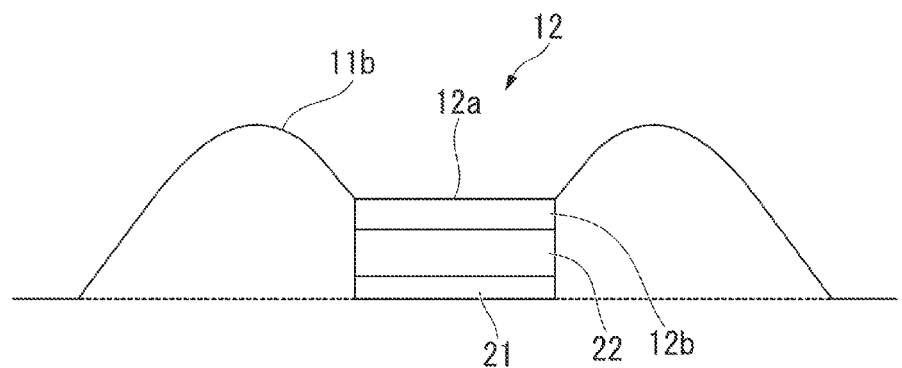
FIG. 3 is a configuration diagram of an operation detection unit of the vehicular operating device.

As shown in FIGS. 2 and 3, for example, each operation detection unit 12 has an operating surface 12a. The operating surface 12a is a surface which forms a concave portion 11b secluded relative to a surface around an attachment surface (that is, the surface of the spoke 11a of the steering wheel 11). The concave portion 11b is configured to house a part (for example, a tip portion or the like) of the finger of the operator who operates the operation detection unit 12.

The operation detection unit 12 is configured to detect a slide operation by the finger of the operator on the operating surface 12a and a pressing force in a pressing direction substantially perpendicular to a plane including the operation direction of the slide operation, and outputs signals of the detection results.

The operation detection unit 12 is configured to detect a change amount or a change rate of the pressing force per predetermined unit time, and determines whether or not the pressing force is equal to or greater than a predetermined first threshold value A based on the change amount or change rate of the pressing force.

Figure 4A:
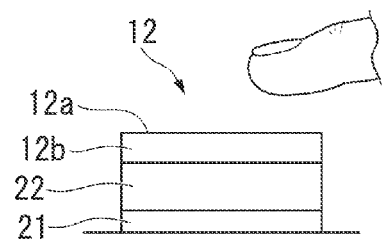
FIG. 4A is a configuration diagram of the operation detection unit of the vehicular operating device.
Figure 4B:
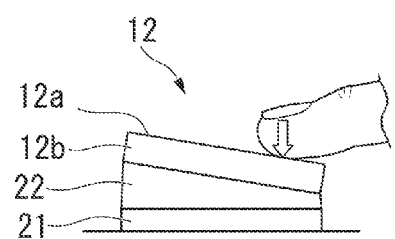
FIG. 4B is a configuration diagram of the operation detection unit of the vehicular operating device.

As shown in FIGS. 4A and 4B, for example, the operation detection unit 12 includes a capacitive sensor 21 on the rear side of the operating surface 12a in the pressing direction (that is, on the rear side of a plate-shaped member 12b which has a front surface forming the operating surface 12a), and an elastic member 22 which is elastically deformable between the capacitive sensor 21 and the operating surface 12a.

The operation detection unit 12 detects a change in the pressing force and a slide operation based on a change in capacitance of the elastic member 22 with the elastic deformation of the elastic member 22 in the pressing direction.

The display unit 13 is, for example, a dashboard display in which a display screen 13a is arranged at the upper part of the dashboard of the vehicle, a head-up display which performs display with the front window of the vehicle as a display screen 13a, a multi-information display in which a display screen 13a is arranged in the instrument panel of the vehicle, a display in which a display screen 13a is arranged near various meters of the instrument panel of the vehicle, or the like.

The display unit 13 displays an operation object, which is operable in accordance with a predetermined operation on the operation detection unit 12, on the display screen 13 to be visually recognizable by the operator.

The control device 14 outputs control commands for controlling the operations of various vehicle equipments 16 based on signals of the detection results output from the operation detection unit 12.

The control device 14 controls display of the operation object on the display screen 13a of the display unit 13 in response to signals of the detection results output from the operation detection unit 12.

For example, the control device 14 recognizes a predetermined gesture pattern based on a slide operation of the operator detected by the operation detection unit 12.

For example, the control device 14 does not execute recognition of the gesture pattern based on a slide operation if the pressing force of the operator detected by the operation detection unit 12 is smaller than the predetermined first threshold value A, and recognizes the gesture pattern based on the slide operation after the pressing force has reached the first threshold value A or more.

Meanwhile, for example, even when it has been detected that the pressing force is smaller than the first threshold value A for a predetermined time (for example, the time for which the slide operation is continuously detected by the operation detection unit 12, or the like) after the operation detection unit 12 has detected that the pressing force is equal to or greater than the predetermined first threshold value A, the control device 14 continues to recognize a gesture pattern based on a slide operation for the predetermined time.

Figure 5:
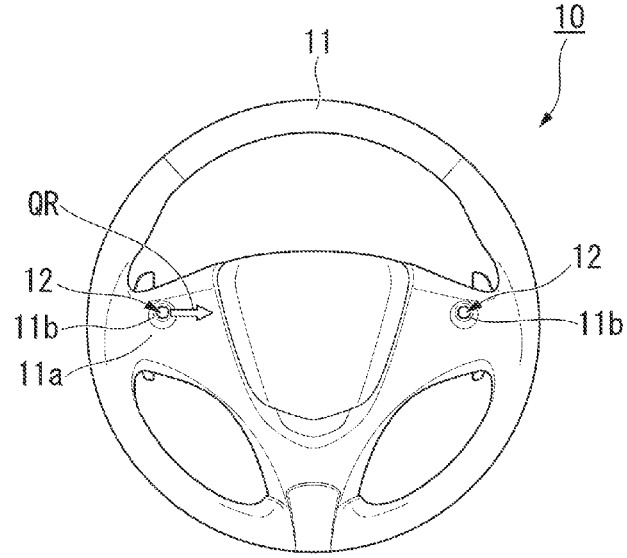
FIG. 5 is a diagram showing an example of the correspondence between a slide operation on the operation detection unit of the vehicular operating device and display on a display unit.
Figure 5:
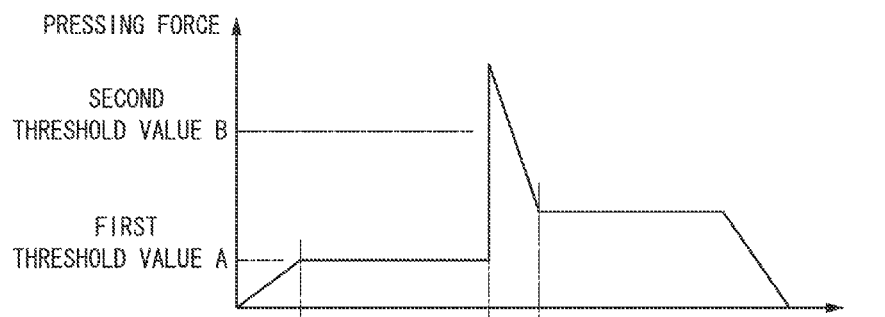
Figure 5:
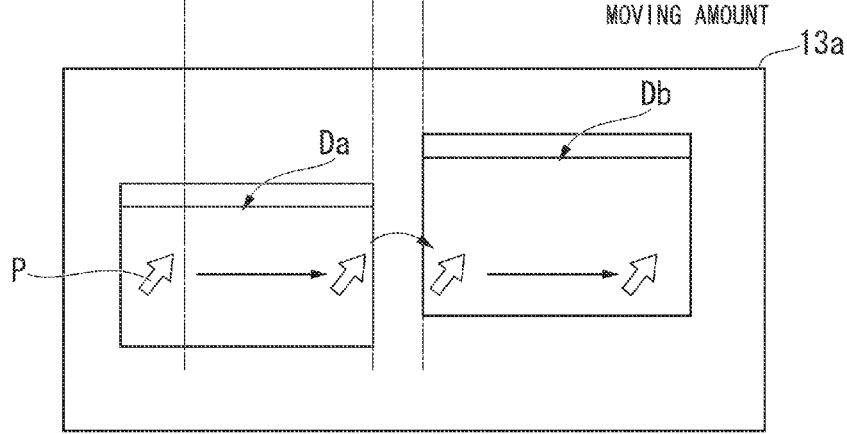

As shown in the parts (A) and (B) of FIG. 5, for example, the control device 14 performs display such that, in a state where an operation object P which is operable on the display screen 13a of the display unit 13 in accordance with a predetermined operation (for example, a slide operation in a right direction QL on the operation detection unit 12 arranged at a position shifted to the left from the rotating shaft O of the steering wheel 11 shown in the part (A) of FIG. 5, or the like) of the operator on the operation detection unit 12 is displayed in a plurality of predetermined display regions (for example, display regions Da, Db, and the like) on the display screen 13a, the operation object P moves in response to the gesture pattern based on the slide operation of the operator.

In this case, in a state where the operation object P is present in a predetermined display region (for example, the display region Da) and is movable in this display region (for example, the display region Da), if the pressing force detected by the operation detection unit 12 is smaller than a predetermined second threshold value B greater than the predetermined first threshold value A, the control device 14 inhibits movement of the operation object P from this display region (for example, the display region Da) to another display region (for example, the display region Db or the like).

When the pressing force detected by the operation detection unit 12 is equal to or greater than the predetermined second threshold value B greater than the predetermined first threshold value A, it is assumed that the operation object P is movable from the display region (for example, the display region Da) where the operation object P is present to another display region (for example, the display region Db).

In regard to movement of the operation object which is operable in accordance with a predetermined operation of the operator on the display screen 13a of the display unit 13, when there is a display which interferes with movement of the operation object, the control device 14 validates interference with movement of the operation object if the pressing force is smaller than the predetermined second threshold value B, and invalidates interference with movement of the operation object if the pressing force is equal to or greater than the predetermined second threshold value B.

The display which interferes with movement of the operation object is, for example, a boundary display which represents the boundary of the display regions, a boundary display which represents the boundary of a plurality of display regions, a display which switches and displays a plurality of types of screen display so as to produce so-called page movement or page ejection, or the like.

Figure 6:
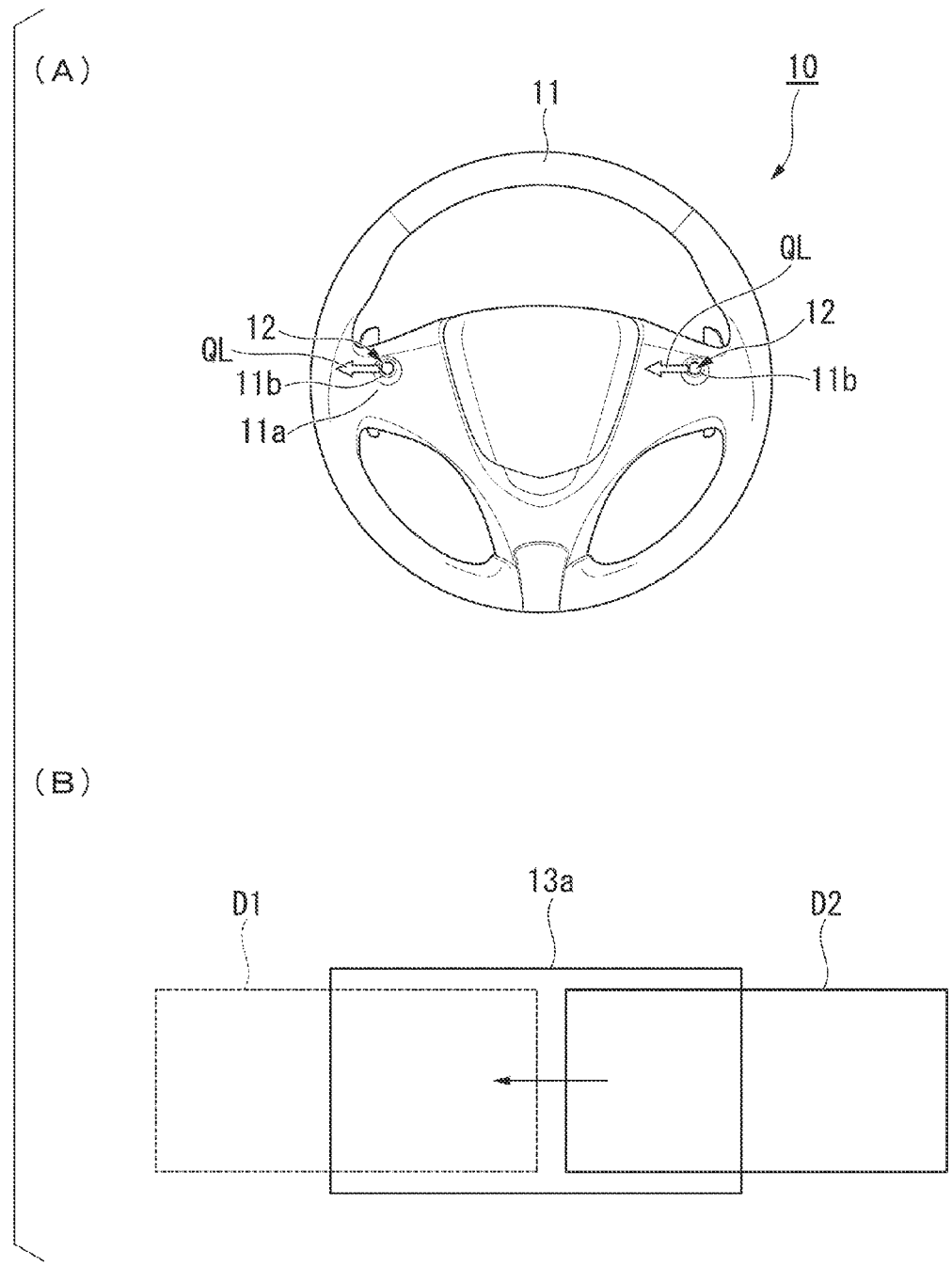
FIG. 6 is a diagram showing an example of the correspondence between a slide operation on the operation detection unit of the vehicular operating device and display on a display unit.

For example, there is a case where a switching display, such as page ejection, is performed. In this case, as shown in the parts (A) and (B) of FIG. 6, when slide operations in the same appropriate operation direction (for example, the left direction QL) are carried out by the operator on the two operation detection units 12 and 12 arranged at the positions shifted to the left and right from the rotating shaft O of the steering wheel 11, if the pressing force detected by each operation detection unit 12 is equal to or greater than the predetermined second threshold value B greater than the predetermined first threshold value A, the control device 14 validates a gesture input by these slide operations.

When this gesture input satisfies a predetermined condition, display is switched by continuous scroll movement (for example, movement from display D1 to display D2) in a direction (for example, the left direction) according to the operation direction (for example, the left direction QL) of the slide operation, or the like.

The predetermined condition relative to a gesture input is, for example, that the slide operations on the two operation detection units 12 and 12 are substantially carried out in the same operation direction, at the same operating speed, with the same control input, at the same operation timing, and the like.

Figure 7:
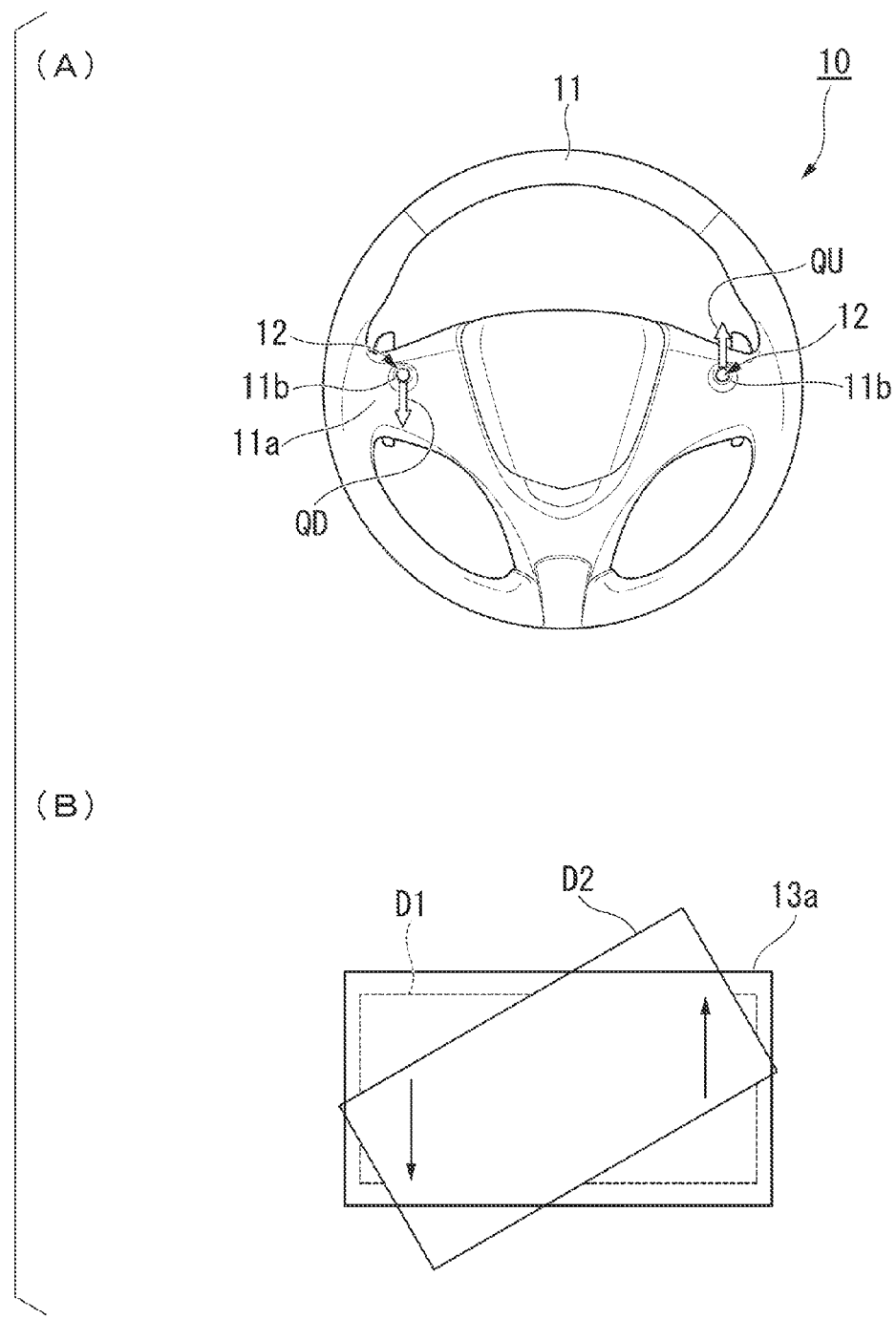
FIG. 7 is a diagram showing an example of the correspondence between a slide operation on the operation detection unit of the vehicular operating device and display on a display unit.

For example, there is a case where a switching display, such as display rotation, is performed. In this case, as shown in the parts (A) and (B) of FIG. 7, when slide operations in opposing directions (upward direction QU and downward direction QD) of the up-down direction are carried out by the operator on the two operation detection units 12 and 12 arranged at the positions shifted to the left and right from the rotating shaft O of the steering wheel 11, if the pressing force detected by each operation detection unit 12 is equal to or greater than the predetermined second threshold value B greater than the predetermined first threshold value A, the control device 14 validates a gesture input by these slide operations.

When this gesture input satisfies a predetermined condition, display is switched by continuous rotational movement (for example, rotational movement from display D1 to display D2) in a rotation direction (for example, the counterclockwise direction or the like) according to the operation directions of the slide operations (for example, the downward direction QD on the left operation detection unit 12 and the upward direction QU on the right operation detection unit 12), or the like.

The predetermined condition relative to a gesture input is, for example, that the slide operations on the two operation detection units 12 and 12 are substantially carried out in opposing operation directions of the up-down direction, at the same operating speed, with the same control input, at the same operation timing, and the like.

Figure 8:
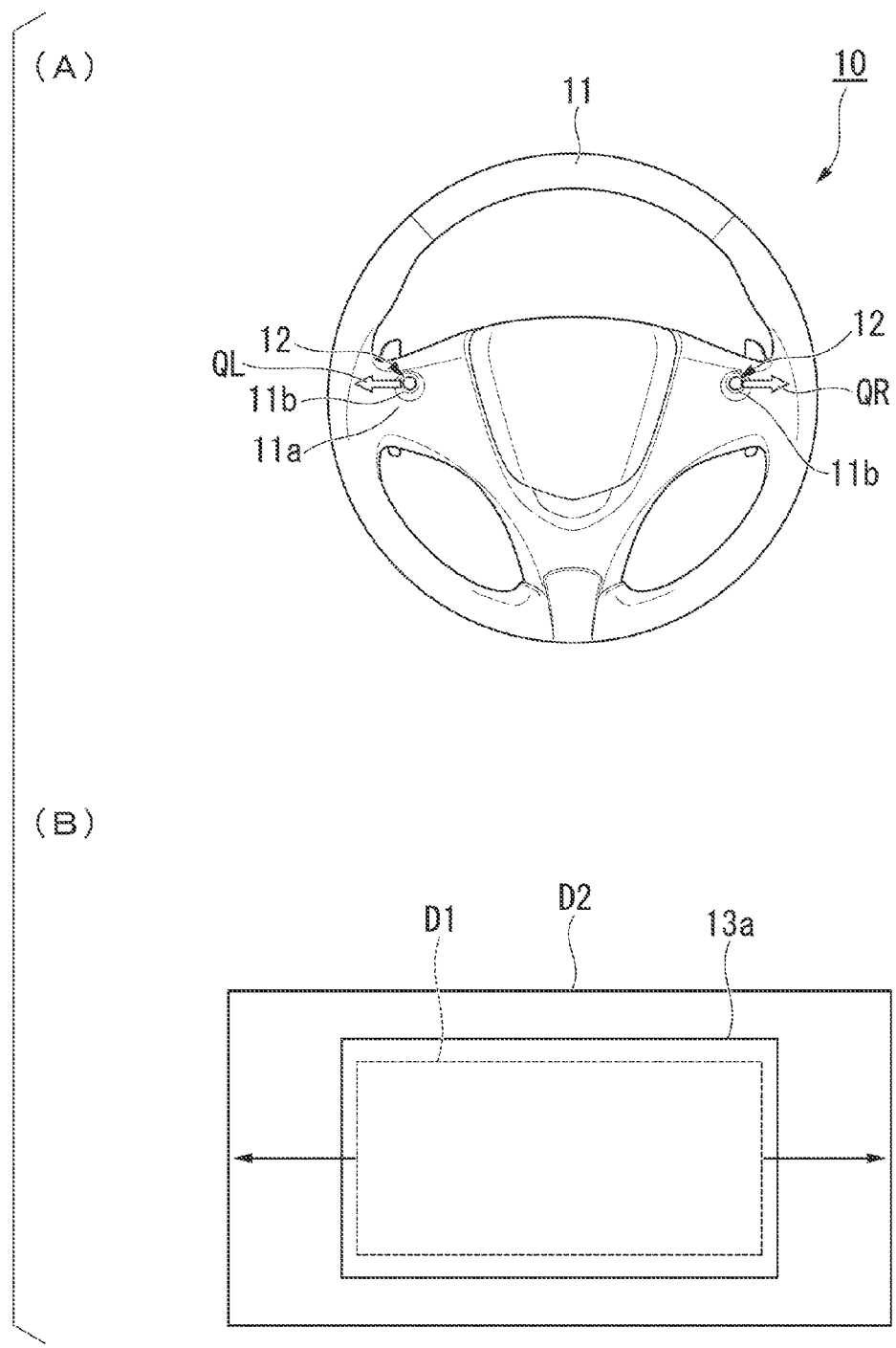
FIG. 8 is a diagram showing an example of the correspondence between a slide operation on the operation detection unit of the vehicular operating device and display on a display unit.

For example, there is a case where a switching display, such as a display enlargement state and a display reduction state, is performed. In this case, as shown in the parts (A) and (B) of FIG. 8, when slide operations in opposing directions (the left direction QL and the right direction QR) of the left-right direction are carried out by the operator on the two operation detection units 12 and 12 arranged at the positions shifted to the left and right from the rotating shaft O of the steering wheel 11, if the pressing force detected by each operation detection unit 12 is equal to or greater than the predetermined second threshold value B greater than the predetermined first threshold value A, the control device 14 validates a gesture input by these slide operations.

When this gesture input satisfies a predetermined condition, display is switched by continuous movement (for example, enlargement movement from display D1 to display D2) to a state (for example, the enlargement state) according to the operation directions of the slide operations (for example, the left direction QL on the left operation detection unit 12 and the right direction QR on the right operation detection unit 12), or the like.

The predetermined condition relative to a gesture input is, for example, that the slide operations on the two operation detection units 12 and 12 are substantially carried out in opposing operation directions of the left-right direction, at the same operating speed, with the same control input, at the same operation timing, and the like.

For example, there is a case where a switching display, such as a display execution state and a display standby state, is performed. In this case, as shown in the parts (A) and (B) of FIG. 9 or the parts (A) and (B) of FIG. 10, when slide operations in opposing directions (the counterclockwise direction QCCW and the clockwise direction QCW) of the rotation direction are carried out by the operator on the two operation detection units 12 and 12 arranged at the positions shifted to the left and right from the rotating shaft O of the steering wheel 11, if the pressing force detected by each operation detection unit 12 is equal to or greater than the predetermined second threshold value B greater than the predetermined first threshold value A, the control device 14 validates a gesture input by these slide operations.

Figure 9:
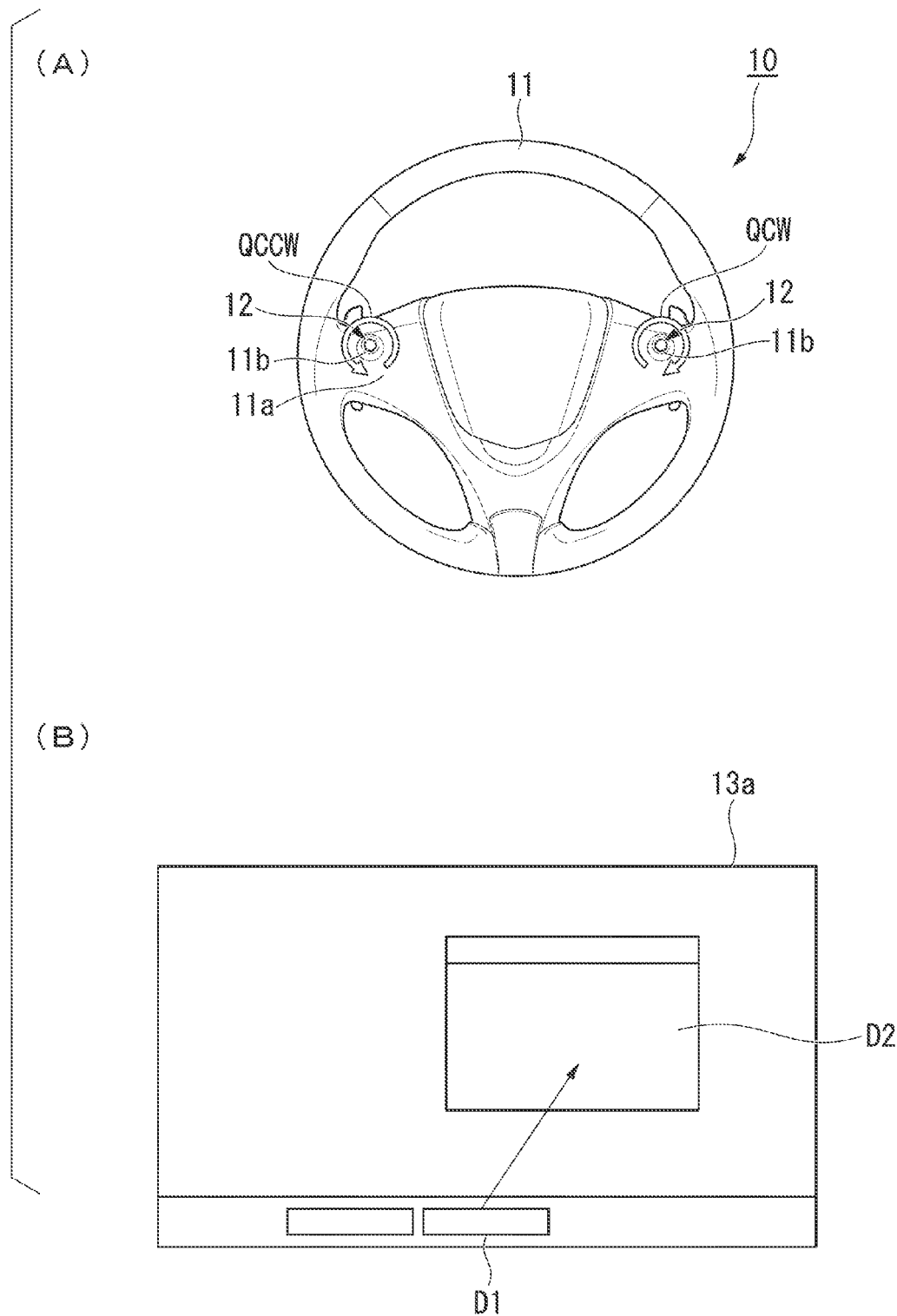
FIG. 9 is a diagram showing an example of the correspondence between a slide operation on the operation detection unit of the vehicular operating device and display on a display unit.
Figure 10:
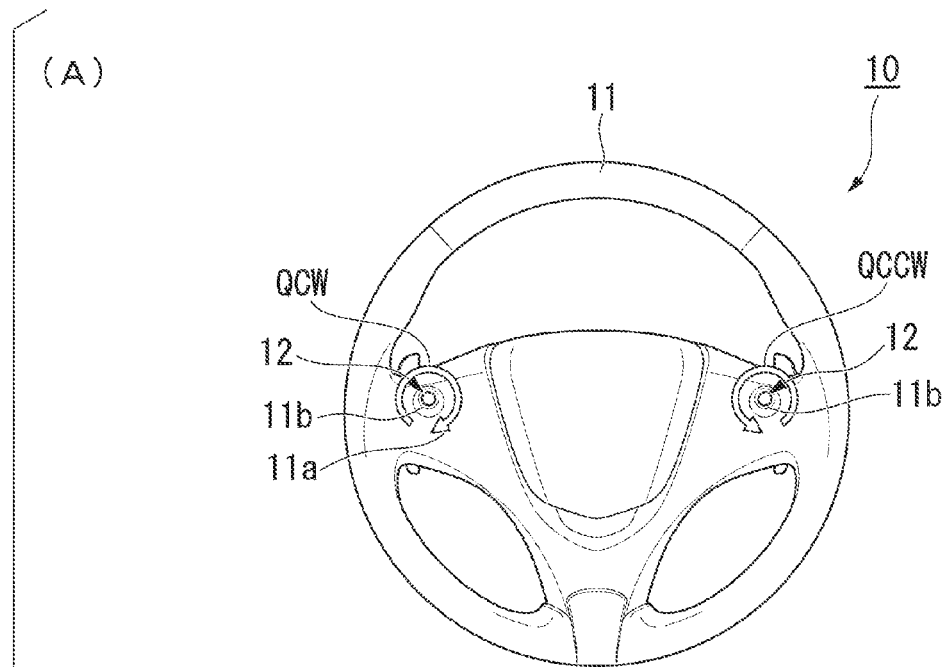
FIG. 10 is a diagram showing an example of the correspondence between a slide operation on the operation detection unit of the vehicular operating device and display on a display unit.
Figure 10:
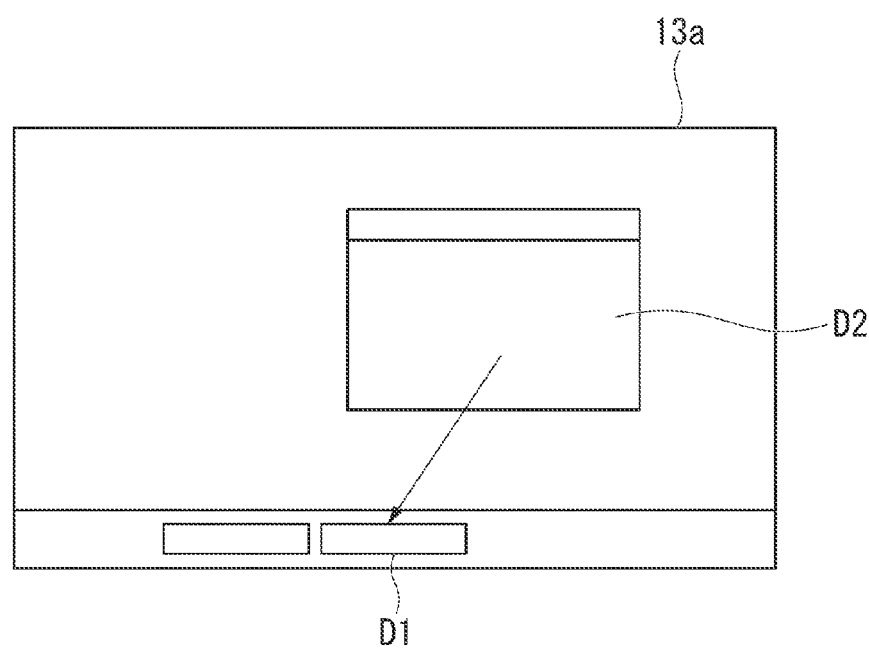

When this gesture input satisfies a predetermined condition, display is switched by, for example, continuous movement (for example, movement from display D1 to display D2) to a state (for example, the execution state) according to the operation directions of the slide operations (the counterclockwise direction QCCW on the left operation detection unit 12 and the clockwise direction QCW on the right operation detection unit 12) shown in the parts (A) and (B) of FIG. 9 or continuous movement (for example, movement from display D2 to display D2) to a state (for example, the standby state) according to the operation directions of the slide operations (the clockwise direction QCW on the left operation detection unit 12 and the counterclockwise direction QCCW on the right operation detection unit 12) shown in the parts (A) and (B) of FIG. 10.

The predetermined condition relative to a gesture input is, for example, that the slide operations on the two operation detection units 12 and 12 are substantially carried out in opposing operation directions of the rotation direction, at the same operating speed, with the same control input, at the same operation timing, and the like.

Figure 11:
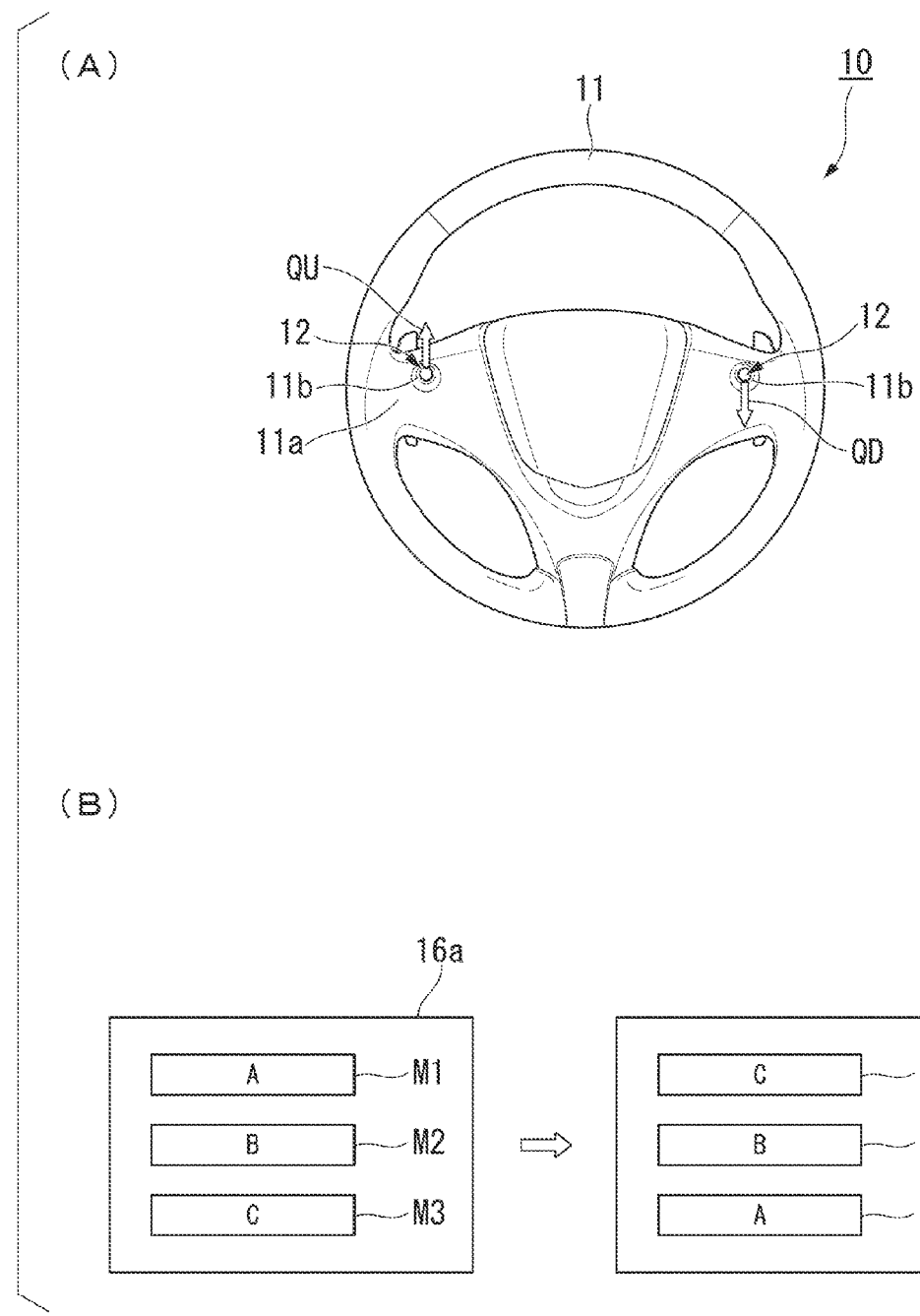
FIG. 11 is a diagram showing an example of the correspondence between a slide operation on the operation detection unit of the vehicular operating device and display on a display unit.

For example, there is a case where sorting display of display items of a menu display is performed. In this case, as shown in the parts (A) and (B) of FIG. 11, when slide operations in opposing directions (the upward direction QU and the downward direction QD) of the up-down direction are carried out by the operator on the two operation detection units 12 and 12 arranged at the positions shifted to the left and right from the rotating shaft O of the steering wheel 11, if the pressing force detected by each operation detection unit 12 is equal to or greater than the predetermined second threshold value B greater than the predetermined first threshold value A, the control device 14 validates a gesture input by these slide operations.

When this gesture input satisfies a predetermined condition, display is switched by continuous sorting movement in a sorting direction (for example, an ascending direction, a descending direction, or the like in an appropriate preferential order relative to a plurality of display items M1 to M3) according to the operation directions of the slide operations (for example, the upward direction QU on the left operation detection unit 12 and the downward direction QD on the right operation detection unit 12), or the like.

The predetermined condition relative to a gesture input is, for example, that the slide operations on the two operation detection units 12 and 12 are substantially carried out in opposing operation directions of the up-down direction, at the same operating speed, with the same control input, at the same operation timing, and the like.

If the steering angle of the steering wheel 11 detected by the steering angle sensor 15 is equal to or greater than a predetermined steering angle, even when the pressing force detected by the operation detection unit 12 is equal to or greater than the predetermined first threshold value A, the control device 14 may not execute (that is, may inhibit) recognition of the gesture pattern based on the slide operation.

If another operating switch 17 different from the operation detection unit 12 is operated, even when the pressing force detected by the operation detection unit 12 is equal to or greater than the predetermined first threshold value A, the control device 14 may not execute (that is, may inhibit) recognition of the gesture pattern based on the slide operation.

As described above, according to the vehicular operating device 10 of this embodiment, in a state where the pressing force of the operator on the operation detection unit 12 reaches the predetermined first threshold value A or more, it is determined that the operator is likely to intentionally carry out a gesture operation, and a gesture pattern is recognized, thereby suppressing an erroneous operation on various vehicle equipments 16.

It is possible to suppress frequent switching regarding whether or not a gesture pattern is recognized in accordance with a temporary change (decrease or the like) in the pressing force and to improve convenience.

While a slide operation is continuously detected, it can be determined that the operator is likely to intentionally carry out a gesture operation, and a gesture pattern can be accurately recognized, thereby suppressing an erroneous operation on various vehicle equipments 16 and improving convenience.

When the pressing force which is equal to or greater than the predetermined second threshold value B greater than the predetermined first threshold value A for determining whether or not a gesture pattern is recognized is detected, the operation object is displayed to move over different display regions. Therefore, it is possible to prevent the operation object from being displayed to move over different display regions despite the intention of the operator and to suppress an erroneous operation on various vehicle equipments 16.

It is determined whether the pressing force is equal to or greater than the predetermined first threshold value A or the second threshold value B based on the change amount or change rate of the pressing force per predetermined unit time, making it possible to improve determination precision regarding whether or not the operator intentionally carries out a gesture operation, and to suppress an erroneous operation on the vehicle equipments 16 when the finger of the operator accidentally touches the operating surface.

When the steering angle of the steering wheel 11 provided with the operation detection unit 12 is equal to or greater than a predetermined steering angle, it can be determined that an erroneous operation not intended by the operator is likely to occur, and recognition of a gesture pattern is inhibited, thereby suppressing an erroneous operation on the vehicle equipment 16 and improving convenience.

When another operating switch 17 is operated, it can be determined that an erroneous operation not intended by the operator is likely to be detected by the operation detection unit 12, and recognition of a gesture pattern is inhibited, thereby suppressing an erroneous operation on the vehicle equipments 16 and improving convenience.

In the operation detection unit 12, it is possible to reduce the size of the capacitive sensor 21 necessary for securing the operating surface 12a of a desired size compared to a case where the elastic member 22 is not provided, and to reduce a space necessary for mounting the operation detection unit 12.

It is possible to reduce the detectable area (that is, the minimum operating area where an operation on the operating surface 12a is detectable), to reduce an operation load, and to improve operability.

Since the operating surface 12a is the surface which forms the concave portion 11b secluded relative to the surface around the attachment surface (that is, the surface of the spoke 11a of the steering wheel 11), it is possible to prevent the finger of the operator from accidentally touching the operating surface 12a.

Even when the operator searches the operating surface 12a with his/her finger without directly visually recognizing the operating surface 12a, it is possible to accurately guide the finger of the operator to the operating surface 12a.

Accordingly, it is possible to secure traveling safety even during driving of the vehicle, and to improve operability on the vehicle equipments 16.

Figure 12A:
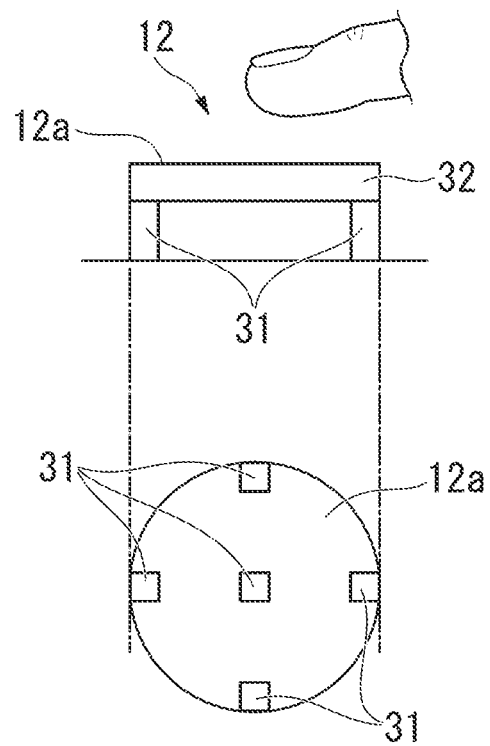
FIG. 12A is a configuration diagram of an operation detection unit of a vehicular operating device according to a modification of an embodiment of the invention.
Figure 12B:
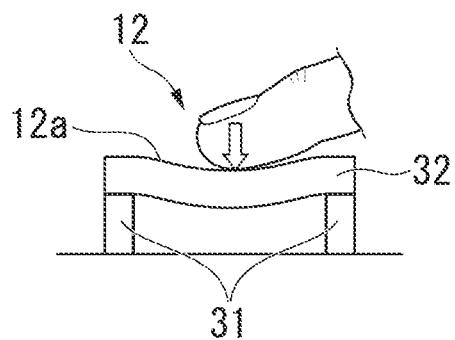
FIG. 12B is a configuration diagram of an operation detection unit of a vehicular operating device according to a modification of an embodiment of the invention.

Although in the vehicular operating device 10 of the above-described embodiment, the operation detection unit 12 includes the capacitive sensor 21, the invention is not limited thereto. For example, as shown in FIGS. 12A and 12B, a piezoelectric element 31 may be provided on the rear side of the operating surface 12a in the pressing direction, and a change in the pressing force may be detected based on a change in resistance of the piezoelectric element 31 which is pressed through the operating surface 12a.

In this case, the operating surface 12a may be the surface of a plate-shaped member 32 which is elastically deformable, a plurality of piezoelectric elements 31 may be arranged on the rear surface of this member, and the area of the front surface or rear surface of the member 32 may be greater than the total contact area of a plurality of piezoelectric elements 31 which are brought into contact with the rear surface.

Accordingly, it is possible to reduce the size of the piezoelectric element 31 necessary for securing the operating surface 12a of a desired size, and to reduce a space necessary for mounting the operation detection unit 12.

It is possible to reduce the detectable area (that is, the minimum operating area where an operation on the operating surface 12a is detectable), to reduce an operation load, and to improve operability.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicular operating device comprising:
a vehicle equipment which is mounted in a vehicle and controllable by a predetermined operation of an operator;
an operation-detection device which has an operating surface and detects a slide operation by a finger of the operator on the operating surface;
a gesture recognition device which recognizes a predetermined gesture pattern based on the slide operation detected by the operation-detection device; and
a control unit which controls the vehicle equipment in response to the gesture pattern recognized by the gesture recognition device,
wherein the operation-detection device is configured to detect a pressing force in a pressing direction substantially perpendicular to a plane including an operation direction of the slide operation,
the gesture recognition device does not execute recognition of the gesture pattern based on the slide operation if the pressing force detected by the operation-detection device is smaller than a predetermined value, and recognizes the gesture pattern based on the slide operation after the pressing force has reached the predetermined value or more,
the operation-detection device is provided on a steering wheel of the vehicle, and when the steering angle of the steering wheel is equal to or greater than a predetermined steering angle, even when the pressing force detected by the operation-detection device is equal to or greater than the predetermined value, the gesture recognition device inhibits recognition of the gesture pattern based on the slide operation.

2. A vehicular operating device comprising:
a vehicle equipment which is mounted in a vehicle and controllable by a predetermined operation of an operator;
an operation-detection device which has an operating surface and detects a slide operation by a finger of the operator on the operating surface;
a gesture recognition device which recognizes a predetermined gesture pattern based on the slide operation detected by the operation-detection device; and
a control unit which controls the vehicle equipment in response to the gesture pattern recognized by the gesture recognition device,
wherein the operation-detection device is configured to detect a pressing force in a pressing direction substantially perpendicular to a plane including an operation direction of the slide operation,
the gesture recognition device does not execute recognition of the gesture pattern based on the slide operation if the pressing force detected by the operation-detection device is smaller than a predetermined value, and recognizes the gesture pattern based on the slide operation after the pressing force has reached the predetermined value or more,
the operation-detection device is provided on a steering wheel of the vehicle, and when an operating switch, which is different from the operation-detection device and controls an operation of another vehicle equipment, is operated, even when the pressing force detected by the operation-detection device is equal to or greater than the predetermined value, the gesture recognition device inhibits recognition of the gesture pattern based on the slide operation.

* * * * *